(12) United States Patent
Giannini et al.

(10) Patent No.: US 12,399,020 B1
(45) Date of Patent: Aug. 26, 2025

(54) SYSTEM AND METHOD FOR MANAGING DRIVERS OF WASTE SERVICE VEHICLES USING A ROUTE MANAGER DAILY ASSISTANCE (RMDA) COMPUTER-BASED PLATFORM

(71) Applicant: WM INTELLECTUAL PROPERTY HOLDINGS, L.L.C., Houston, TX (US)

(72) Inventors: Gerardo Giannini, Canton, GA (US); Bill Minnis, Homer, AK (US); Billy Faultner, Phoenix, AZ (US); Sherri Knape, Bella Vista, AR (US); Christopher Galvin, Houston, TX (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

(21) Appl. No.: 18/941,323

(22) Filed: Nov. 8, 2024

Related U.S. Application Data

(60) Provisional application No. 63/547,815, filed on Nov. 8, 2023.

(51) Int. Cl.
```
G01C 21/34      (2006.01)
H04W 4/029      (2018.01)
H04W 4/44       (2018.01)
```

(52) U.S. Cl.
CPC ........ *G01C 21/3446* (2013.01); *H04W 4/029* (2018.02); *H04W 4/44* (2018.02)

(58) Field of Classification Search
CPC ....... B60W 60/0015; B60W 30/18163; B60W 2554/4041; B60W 2754/30; B60W 2710/30; B60H 1/008; B60H 1/00849
See application file for complete search history.

(56) References Cited

U.S. PATENT DOCUMENTS 9,037,406 B2   5/2015   Mason et al.
9,574,892 B2   2/2017   Rodoni
(Continued)

FOREIGN PATENT DOCUMENTS

KR         102499015 B1      2/2023

OTHER PUBLICATIONS

Ali, Bakhtiar et al.; Internet of Things-Assisted Vehicle Route Optimization for Municipal Solid Waste Collection; Applied Sciences; Dec. 28, 2023; 15 pages.
(Continued)

*Primary Examiner* — Peter D Nolan
*Assistant Examiner* — Wae L Louie
(74) *Attorney, Agent, or Firm* — Greenberg Traurig LLP

(57) ABSTRACT

A system and method for managing drivers of waste service vehicles using a route manager daily assistance (RMDA) computer-based platform are provided. The computer-based platform can assist a route manager, on a routine or even daily basis if desired, with onboarding, developing and coaching drivers of waste or recycling service vehicles, as well as improving safety, enhancing customer service, and delivering greater efficiency and savings. The software-based platform utilizes a dashboard display that defines key metrics and makes various tasks and data visible to the route manager for ease of route planning, coaching and daily execution.

5 Claims, 5 Drawing Sheets

(56) References Cited

U.S. PATENT DOCUMENTS

| | | | |
|---|---|---|---|
| 10,594,991 B1 | 3/2020 | Skolnick | |
| 10,794,715 B1* | 10/2020 | Truong | G01C 21/3446 |
| 10,852,152 B2 | 12/2020 | Mitchell et al. | |
| 10,977,606 B1* | 4/2021 | Mimassi | G06Q 10/063114 |
| 11,274,929 B1* | 3/2022 | Afrouzi | G06T 7/30 |
| 11,373,536 B1 | 6/2022 | Savchenko et al. | |
| 11,386,362 B1 | 7/2022 | Kim et al. | |
| 12,002,002 B1 | 6/2024 | Jenkins | |
| 2017/0282821 A1* | 10/2017 | Zych | B60R 16/037 |
| 2017/0336788 A1* | 11/2017 | Iagnemma | G05D 1/0246 |
| 2020/0353917 A1* | 11/2020 | Leitermann | B60W 30/18054 |
| 2021/0049559 A1 | 2/2021 | Kilburn | |
| 2022/0082394 A1* | 3/2022 | Radakovic | G01C 21/3461 |
| 2022/0129849 A1* | 4/2022 | Mimassi | G06Q 10/08 |
| 2024/0211898 A1 | 6/2024 | Abdallah | |
| 2024/0384995 A1* | 11/2024 | Nellore | G01C 21/383 |
| 2025/0046436 A1* | 2/2025 | Zak | H04W 4/90 |

OTHER PUBLICATIONS

GPS Insight Company; Plan and Optimize Routes Without a Complex, Costly Routing System; 2024; pages.

Routeware; On-Board Computers for an Integrated Waste Management System; 2024.

Safe Fleet; Real-time Business Intelligence for your Waste & Recycling Fleet; 2024; 14 pages.

Track Your Truck; GPS Fleet Tracking for Garbage Trucks; 2024; 8 pages.

\* cited by examiner

FIG. 4

SYSTEM AND METHOD FOR MANAGING DRIVERS OF WASTE SERVICE VEHICLES USING A ROUTE MANAGER DAILY ASSISTANCE (RMDA) COMPUTER-BASED PLATFORM

RELATED APPLICATIONS

This application claims the benefit, and priority benefit, of U.S. Provisional Patent Application Ser. No. 63/547,815, filed Nov. 8, 2023, the disclosure and contents of which are incorporated by reference herein in their entirety.

BACKGROUND

Field of the Invention

The presently disclosed subject matter relates generally to managing drivers of waste service vehicles, and more particularly, to a system and method for managing drivers of waste service vehicles using a route manager daily assistance (RMDA) computer-based platform.

Description of the Related Art

Waste and recycling collection providers often serve large geographic areas and have large numbers of residential, commercial and industrial customers to service. As a result, collection routes are complicated to plan and organize.

Frontline or driver supervisors (also known as route managers) rely on many different data sources to do their job well, which requires a significant amount of time to gather information.

Many providers use route optimization tools and software in an effort to improve efficiencies. Historically, these software systems have had certain limitations and disadvantages.

Improvements in this field of technology are therefore desired.

SUMMARY

Various illustrative embodiments of a system and method for managing drivers of waste service vehicles using a route manager daily assistance (rmda) computer-based platform are provided herein.

In certain illustrative embodiments, a method of identifying the location of a plurality of waste or recycling service vehicles in a geographical service area is provided. Location information can be collected for a first waste or recycling service vehicle in the geographical service area using a first locating device comprising a global positioning system receiver associated with the first waste or recycling service vehicle. A location can be identified for the first waste or recycling service vehicle in the geographical service area based on the most recently collected location information for the first waste or recycling service vehicle within a designated time period. Location information can be collected for a second waste or recycling service vehicle in the geographical service area using a second locating device comprising a global positioning system receiver associated with the second waste or recycling service vehicle. A location can be identified for the second waste or recycling service vehicle in the geographical service area based on the most recently collected location information for the second waste or recycling service vehicle within the designated time period. Location information can be collected for a third vehicle in the geographical service area using a third locating device comprising a global positioning system receiver associated with the third vehicle. A location can be identified for the third vehicle in the geographical service area based on the most recently collected location information for the third vehicle within the designated time period. Turn-by-turn navigation directions can be calculated from the location of the third vehicle to the location of the first waste or recycling service vehicle. Turn-by-turn navigation directions can also be calculated from the location of the third vehicle to the location of the second waste or recycling service vehicle. A determination can be made of whether the turn-by-turn navigation directions from the location of the third vehicle to the location of the first waste or recycling service vehicle or the turn-by-turn navigation directions from the location of the third vehicle to the location of the second waste or recycling service vehicle is a shorter path. An indication of the shorter path and/or the turn-by-turn navigation directions for the shorter path can be displayed on an electronic viewing portal for viewing by a driver of the third vehicle. The shorter path can comprise shorter in distance or shorter in time.

In certain illustrative embodiments, a system for identifying the location of a plurality of waste or recycling service vehicles in a service area is provided. The system can include a processor in communication with a memory storage area and configured to: collect location information for a first waste or recycling service vehicle in the geographical service area using a first locating device comprising a global positioning system receiver associated with the first waste or recycling service vehicle; identify a location for the first waste or recycling service vehicle in the geographical service area based on the most recently collected location information for the first waste or recycling service vehicle within a designated time period; collect location information for a second waste or recycling service vehicle in the geographical service area using a second locating device comprising a global positioning system receiver associated with the second waste or recycling service vehicle; identify a location for the second waste or recycling service vehicle in the geographical service area based on the most recently collected location information for the second waste or recycling service vehicle within the designated time period; collect location information for a third vehicle in the geographical service area using a third locating device comprising a global positioning system receiver associated with the third vehicle; identify a location for the third vehicle in the geographical service area based on the most recently collected location information for the third vehicle within the designated time period; determine turn-by-turn navigation directions from the location of the third vehicle to the location of the first waste or recycling service vehicle; determine turn-by-turn navigation directions from the location of the third vehicle to the location of the second waste or recycling service vehicle; determine whether the turn-by-turn navigation directions from the location of the third vehicle to the location of the first waste or recycling service vehicle or the turn-by-turn navigation directions from the location of the third vehicle to the location of the second waste or recycling service vehicle is a shorter path; and display, on an electronic viewing portal, an indication of the shorter path and/or the turn-by-turn navigation directions for the shorter path for viewing by a driver of the third vehicle. In certain illustrative embodiments, the third vehicle can view and compare location information for more than just two other vehicles (e.g. three, four, five or more vehicles . . . ), in order to determine shortest path and display, on an electronic viewing portal, an indication of the shortest path and/or the turn-by-turn navigation directions for the shortest path for viewing by a driver of the third vehicle.

BRIEF DESCRIPTION OF THE DRAWINGS

A better understanding of the presently disclosed subject matter can be obtained when the following detailed description is considered in conjunction with the drawings and figures herein, wherein:

FIG. 4 is a front view of a representative description of a "New Coaching Action" on a "Driver Details" screen on a dashboard display of a route manager daily assistance (RMDA) computer-based platform, according to embodiments of the present disclosure.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims of a corresponding non-provisional patent application.

DETAILED DESCRIPTION

The presently disclosed subject matter relates to a system and method for managing drivers of waste service vehicles using a route manager daily assistance (RMDA) computer-based platform.

According to certain illustrative embodiments, a computer-based platform is provided that can assist a route manager, on a routine or even daily basis if desired, with onboarding, developing and coaching drivers of waste or recycling service vehicles, as well as improving safety, enhancing customer service, and delivering greater efficiency and savings. The software-based platform utilizes a dashboard display 10 that defines key metrics and makes various tasks and data visible to the route manager for ease of route planning, coaching and daily execution.

Figure 1:
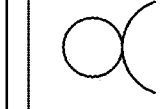
FIG. 1 is a front view of a "Driver Details" screen on a dashboard display of a route manager daily assistance (RMDA) computer-based platform, according to embodiments of the present disclosure.

An illustrative embodiment of a "Driver Details" screen on the dashboard display 10 is shown in FIG. 1. A primary responsibility of a route manager is to onboard, coach, mentor, train and grow drivers of waste or recycling service vehicles. The drivers spend much of the day in their vehicles in the field, and so for a route manager to have a coaching opportunity, the route managers often have to meet the drivers out on their route in order to engage in conversations. And to do this, they have to find them. This can often require extended time periods to, e.g., call dispatch, find a driver out on route, etc. If a route manager has multiple drivers out on routes in the field, and the route manager needs to have conversations with some or all of these drivers within any given time period, it can lead to inefficiencies. The "Driver Details" screen on the dashboard display 10 helps the route manager to minimize these inefficiencies.

Figure 2:
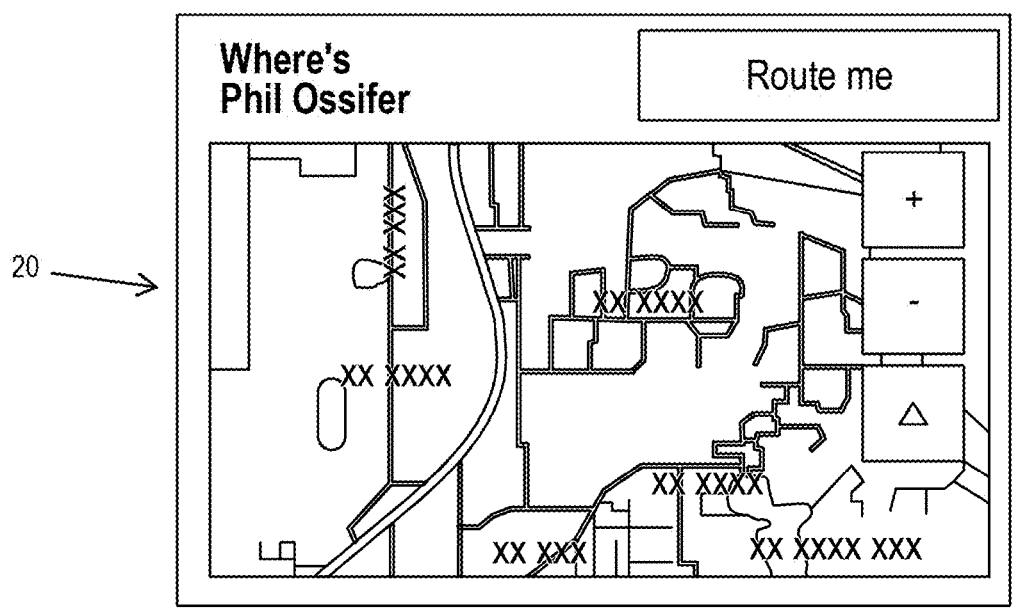
FIG. 2 is a front view of an exploded section of a tool for determining the location of the driver on a "Driver Details" screen on a dashboard display of a route manager daily assistance (RMDA) computer-based platform, according to embodiments of the present disclosure.

At FIG. 2, a exploded view 20 from the "Driver Details" screen on the dashboard display 10 is shown. The image in the exploded view 20 relates to a tool for determining the location of the driver of the waste service vehicle. The "Where's Phil Ossifer?" indicator on the dashboard display 10 is a indication of a selected driver's location in real time on a geographic map. If the "Route Me" indicator is clicked, the route manager will be navigated to the selected driver's current location. More specifically, the tool takes the GPS position from the route manager's computer device (which may be a laptop, tablet, mobile phone, cellular device, etc. . . . ), and it gives turn by turn directions to the GPS Ping on the driver's vehicle based on the last GPS ping on that driver's vehicle from some prior time period (e.g., 15 seconds). Thus, the route manager can be provided with turn by turn directions from where the route manager is physically located with their tablet, to the driver's actual location, so they can find their way to exactly where the driver is. The application may be present in the form of a downloadable application installable and executable on the tablet or other user devices, e.g., "electronic viewing portals" such as computers or smartphones, or tablets. Additionally (or alternatively), the application may be available as one or more web applications, accessible via a device having an internet browser.

Figure 3:
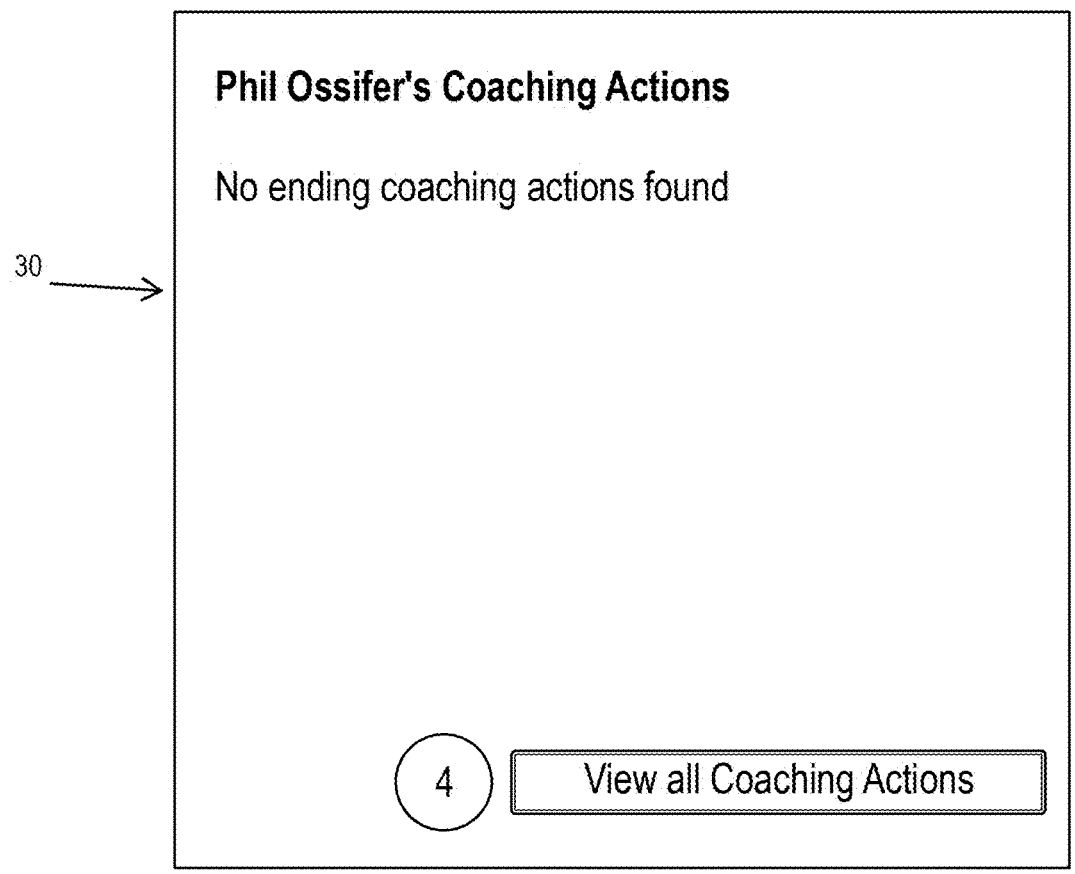
FIG. 3 is a front view of an exploded section of a tool for coordination of coaching actions on a "Driver Details" screen on a dashboard display of a route manager daily assistance (RMDA) computer-based platform, according to embodiments of the present disclosure.

At FIG. 3, another exploded view 30 from the "Driver Details" screen on the dashboard display 10 is shown. This exploded view 30 relates to a tool for coordination of coaching actions. These tools helps to simplify coaching actions for the route manager and create accountability and visibility so that the route manager does not lose touch or lose track of who they are coaching.

Figure 4:
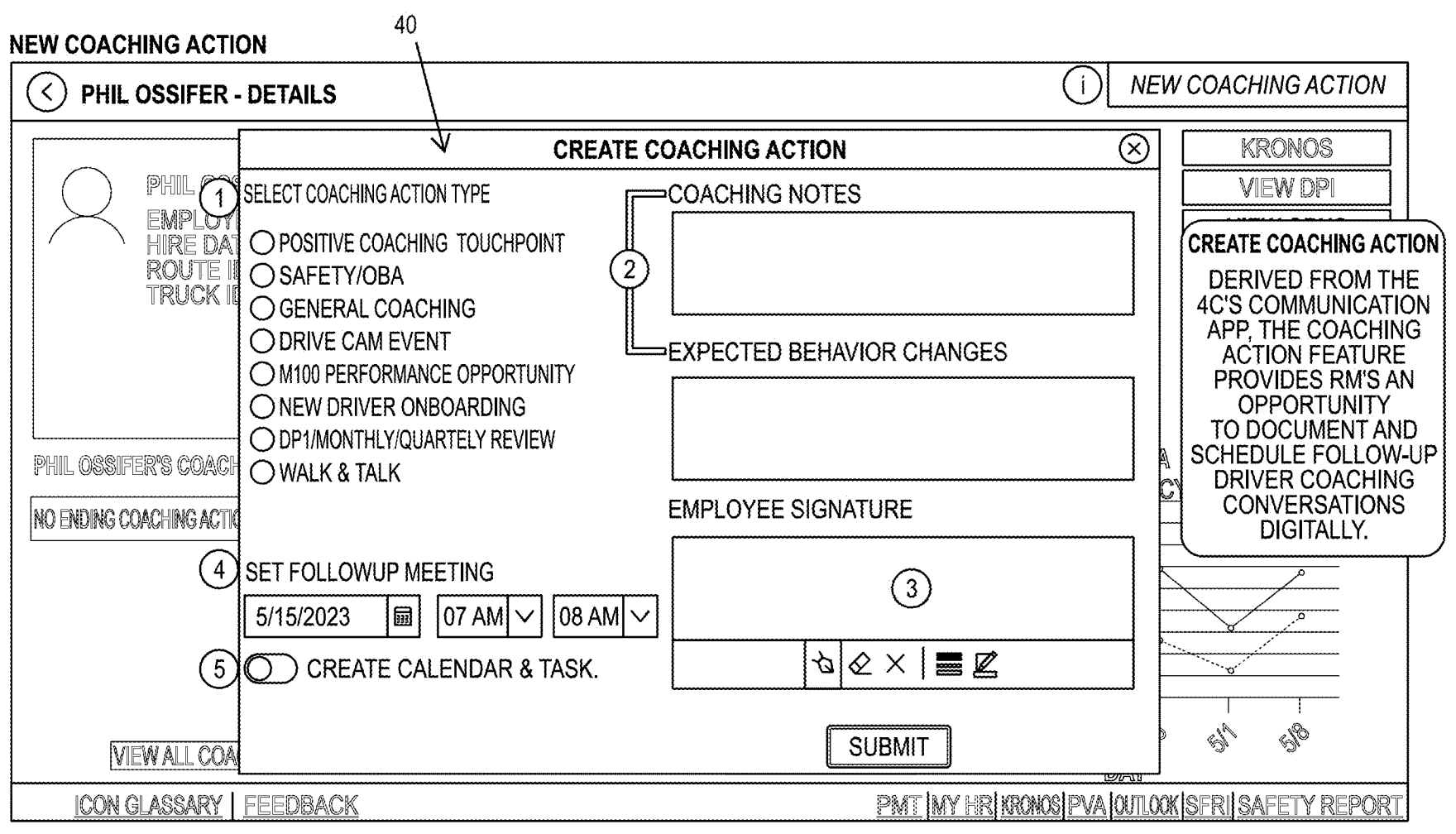
Figure 5:
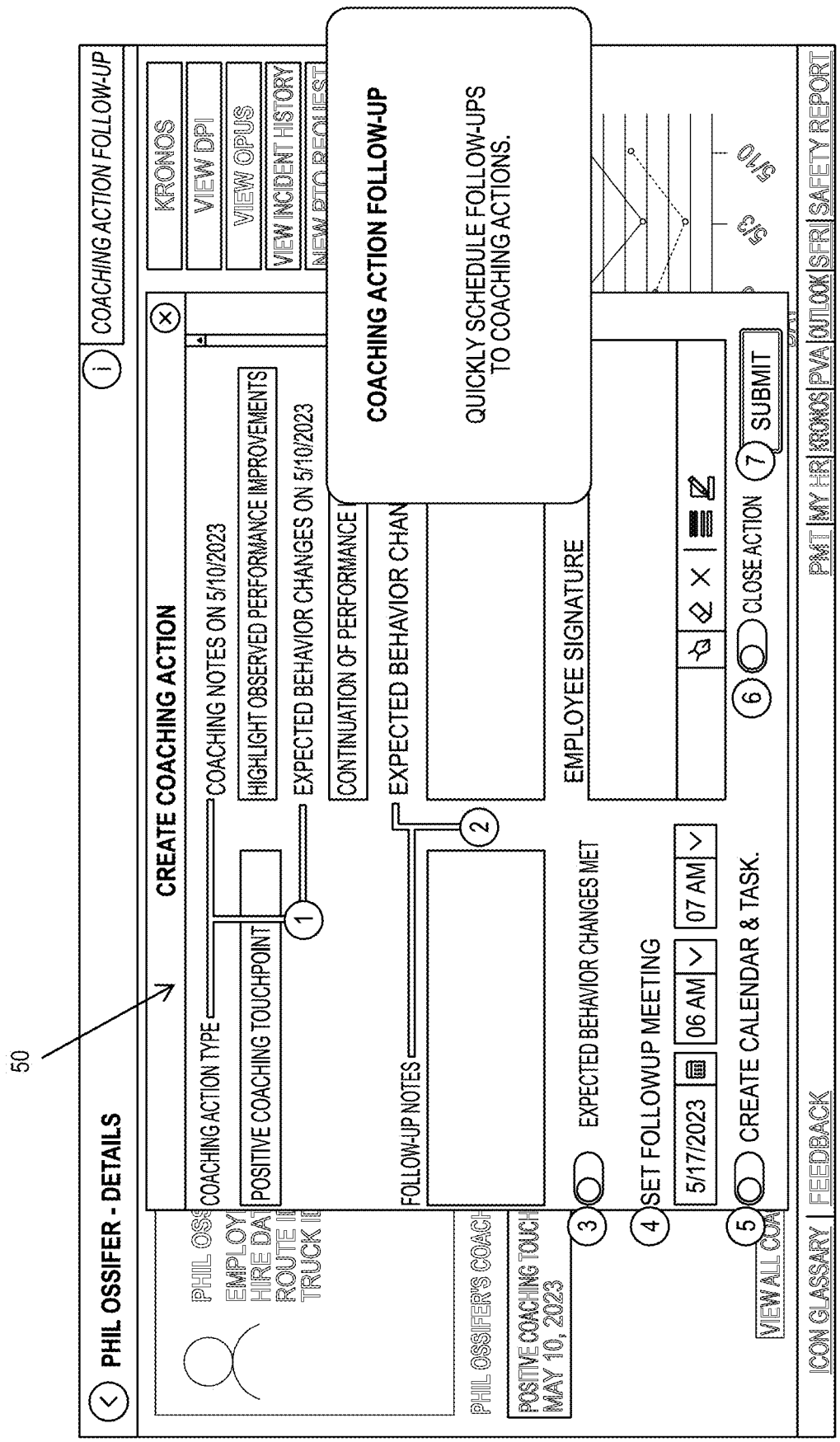
FIG. 5 is a front view of a representative description of a "Coaching Action Follow-Up" on a "Driver Details" screen on a dashboard display of a route manager daily assistance (RMDA) computer-based platform, according to embodiments of the present disclosure.

At FIG. 4, a display screen 40 with a representative description of a "New Coaching Action" is shown. At FIG. 5, a display screen 50 with a representative description of a "Coaching Action Follow-Up" is shown. If the route manager wanted to give Phil Ossifer a positive coaching touch point, based on positive feedback from a particular customer, the route manager can select a dropdown item named "Positive Coaching Touchpoint" from a dropdown menu, and give specific and targeted feedback in a "Coaching Notes" window such as "great customer service," as well as additional feedback in a "Expected Behavior Changes" window such as "no changes-keep up the great work!" If an expected behavior change was met by a driver, the route manager could select a toggle button at "Expected Behavior Changes Met" to indicate accordingly. If the route manager wanted to set up a follow up conversation with Phil Ossifer, they could select "Set FollowUp Meeting" and add a calendar invite for some future date.

In order for a route manager to have quick and efficient access to drivers, an accurate determination of a vehicle's current location is critical. A Global Positioning System (GPS) is an example of a location determining system used to determine vehicle location. The GPS includes a plurality of satellites that generate satellite signals sensed by a GPS receiver at the vehicle. The GPS receiver determines location of the vehicle based on the signals received from the plurality of satellites. A transmitted geolocation measurement for the GPS receiver is referred to as a "GPS ping."

In certain illustrative embodiments, a method of identifying the location of a plurality of waste or recycling service vehicles in a geographical service area is provided. Location information can be collected for a first waste or recycling service vehicle in the geographical service area using a first locating device comprising a global positioning system receiver associated with the first waste or recycling service vehicle. A location can be identified for the first waste or recycling service vehicle in the geographical service area based on the most recently collected location information for the first waste or recycling service vehicle within a designated time period. Location information can be collected for a second waste or recycling service vehicle in the geographical service area using a second locating device comprising a global positioning system receiver associated with the second waste or recycling service vehicle. A location can be identified for the second waste or recycling service vehicle in the geographical service area based on the most recently collected location information for the second waste or recycling service vehicle within the designated time period. Location information can be collected for a third vehicle in the geographical service area using a third locating device comprising a global positioning system receiver associated with the third vehicle. A location can be identified for the third vehicle in the geographical service area based on the most recently collected location information for the third vehicle within the designated time period. Turn-by-turn navigation directions can be calculated from the location of the third vehicle to the location of the first waste or recycling service vehicle. Turn-by-turn navigation directions can also be calculated from the location of the third vehicle to the location of the second waste or recycling service vehicle. A determination can be made of whether the turn-by-turn navigation directions from the location of the third vehicle to the location of the first waste or recycling service vehicle or the turn-by-turn navigation directions from the location of the third vehicle to the location of the second waste or recycling service vehicle is a shorter path. An indication of the shorter path and/or the turn-by-turn navigation directions for the shorter path can be displayed on an electronic viewing portal for viewing by a driver of the third vehicle. The shorter path can comprise shorter in distance or shorter in time.

In certain illustrative embodiments, a system for identifying the location of a plurality of waste or recycling service vehicles in a service area is provided. The system can include a processor in communication with a memory storage area and configured to: collect location information for a first waste or recycling service vehicle in the geographical service area using a first locating device comprising a global positioning system receiver associated with the first waste or recycling service vehicle; identify a location for the first waste or recycling service vehicle in the geographical service area based on the most recently collected location information for the first waste or recycling service vehicle within a designated time period; collect location information for a second waste or recycling service vehicle in the geographical service area using a second locating device comprising a global positioning system receiver associated with the second waste or recycling service vehicle; identify a location for the second waste or recycling service vehicle in the geographical service area based on the most recently collected location information for the second waste or recycling service vehicle within the designated time period; collect location information for a third vehicle in the geographical service area using a third locating device comprising a global positioning system receiver associated with the third vehicle; identify a location for the third vehicle in the geographical service area based on the most recently collected location information for the third vehicle within the designated time period; determine turn-by-turn navigation directions from the location of the third vehicle to the location of the first waste or recycling service vehicle; determine turn-by-turn navigation directions from the location of the third vehicle to the location of the second waste or recycling service vehicle; determine whether the turn-by-turn navigation directions from the location of the third vehicle to the location of the first waste or recycling service vehicle or the turn-by-turn navigation directions from the location of the third vehicle to the location of the second waste or recycling service vehicle is a shorter path; and display, on an electronic viewing portal, an indication of the shorter path and/or the turn-by-turn navigation directions for the shorter path for viewing by a driver of the third vehicle. In certain illustrative embodiments, the third vehicle can view and compare location information for more than just two other vehicles (e.g. three, four, five or more vehicles . . . ), in order to determine shortest path and display, on an electronic viewing portal, an indication of the shortest path and/or the turn-by-turn navigation directions for the shortest path for viewing by a driver of the third vehicle.

The presently disclosed system and method can be utilized with an exemplary computer system and associated communication network. In certain illustrative embodiments, a central server can be configured to receive and store operational data (e.g., data received from waste services vehicles) and evaluate the data to aid waste services company in improving operational efficiency. Central server can include various means for performing one or more functions in accordance with embodiments of the present invention, including those more particularly shown and described herein; however, central server may include alternative devices for performing one or more like functions without departing from the spirit and scope of the present invention.

In certain illustrative embodiments, central server can include standard components such as processor and user interface for inputting and displaying data, such as a keyboard and mouse or a touch screen, associated with a standard laptop or desktop computer. Central server also includes a communication device for wireless communication with onboard computer on the waset or recycling vehicles.

The central server may include software that communicates with one or more memory storage areas. Memory storage areas can be, for example, multiple data repositories which stores pre-recorded data pertaining to wset or recycling collection services and driver information and instructions. Such information may include driver location, customer location, route data, items expected to be removed from the customer site, and/or billing data. A database for data storage can be in memory storage area and/or supplementary external storage devices as are well known in the art.

While a "central server" is described herein, a person of ordinary skill in the art will recognize that embodiments of the present invention are not limited to a client-server architecture and that the server need not be centralized or limited to a single server, or similar network entity or mainframe computer system. Rather, the server and computing system described herein may refer to any combination of devices or entities adapted to perform the computing and networking functions, operations, and/or processes described herein without departing from the spirit and scope of embodiments of the present invention.

The presently disclosed system and method can be utilized for a number of practical applications, and provide route managers with the following advantages and benefits (without limitation) over current systems:

Access to Dynamic Daily Priorities:

Punch lists with algorithm to reset and prioritize daily; dynamic based on area and site priorities; tool intelligence-Recognize by area, area leader, site, rm, driver, and/or operations specialist.

All of the Information about Drivers in One Place:

Easy access of Ops tools, data, and reporting (Baseline trend); visibility to TRIR, HARR, Scheduled observations, Drive Cam™ coaching and behaviors; customer focus to include QoS, Snapshot (low performer), and VOC link; MHN quick view-week to date and yesterday (how are they doing); Brief talking points summarizing why driver missed target; HOC Escalation and Code Red-Ease of review; Make it easy to coach on any pending discipline.

Assistance with Upskilling and Supporting Drivers:

Data to recognize and celebrate wins; Onboarding & Retention-Tracking new employee touches Access to Information Readily and On-the-go:

Route Manager can utilize a rugged laptop computer such as, e.g., a Dell ToughBook™ device, and have visibility to dashboard from the field; Dashboard must be mobile compatible. Devices must be cellular-enabled.

Prior to the presently disclosed system and method, route managers did not have have any tools to adequately help them organize their daily jobs. The presently disclosed system and method guide a route manager through the priorities of their day, to land all tools they will need in a single pane of glass, and to provide them visibility/access to finding their drivers with a "Route Me" functionality. As previously noted, route managers face several difficulties when trying to find a driver out on route. The route manager has to call dispatch on any given day to get a location of the driver. By the time the route manager gets out to that location, the driver has long since moved on. The route manager can call dispatch again to try to get another location and vicinity of where they believe a driver will be and start driving up and down streets and looking in containers to see if they have yet to be serviced to help them narrow down if the driver been there yet, or have they already missed him, and this can take approx. 2-4 hours per driver that they are trying to find.

In certain illustrative embodiments, the presently disclosed system and method can allow route managers to have access to cellular laptops, tablets or similar devices such as, e.g., a Dell ToughBook™ device, whereby they can utilize the GPS Ping off of the cellular device and use the GPS Ping off the GPS on a driver's truck along with mapping functionality (e.g., via Bing™ maps) to give the route manager turn-by-turn directions to the last 15 second GPS ping on the driver's truck. As a result, the route manager no longer has to call dispatch or drive up and down streets looking for that driver. Instead, the route manager is directed to the location of that last ping, and they can come in/out of the mapping functionality as many times as they need to get those turn-by-turn directions to find the driver.

Additionally, prior to the presently disclosed system and method, route managers were required to individually access many different tools and platforms to manually pull together data points to assist them with having a single effective coaching conversation with a single driver in any single day. In certain illustrative embodiments, the presently disclosed system and method acts as a single pane of glass giving the route manager the ability to see all of those individual and separate log-in tools on a single page and provides a data upload directly from all of those previously and individually accessed operational tools and puts the information on this single pane of glass. This saves the route manager from having to sign into each tool and dig/collect those data points on their own that again, drives an effective conversation with their driver. Additionally, the presently disclosed system and method allows route managers to be in the field front facing with their drivers, to facilitate onboarding, coaching, mentoring, and performance managing from the field which is where the driver spends his entire day. Lastly, in certain illustrative embodiments, the presently disclosed system and method can be configured to remove the manual calculations that a route manager has to perform to tally driver worked hours in a week.

Those skilled in the art will appreciate that portions of the subject matter disclosed herein may be embodied as a method or system. Accordingly, these portions of the subject matter disclosed herein may take the form of an entirely hardware embodiment, an entirely software embodiment, or an embodiment combining software and hardware. Furthermore, portions of the subject matter disclosed herein may be a computer program product on a computer-usable storage medium having computer readable program code on the medium. Any suitable computer readable medium may be utilized including hard disks, CD-ROMs, optical storage devices, or other storage devices. Accordingly, embodiments may, for example, take the form of hardware, software or any combination thereof, and/or may exist as part of an overall system architecture within which the software will exist.

Moreover, the system may correspond to or may be part of a computer and/or any other computing device, such as a workstation, server, mainframe, super computer, and/or portable computing device such as (without limitation) a laptop, tablet or mobile phone. The present detailed description is, therefore, not intended to be taken in a limiting sense.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

What is claimed is:

1. A method of identifying the location of a plurality of waste or recycling service vehicles in a geographical service area, the method comprising:

collecting location information for a first waste or recycling service vehicle in the geographical service area using a first locating device comprising a global positioning system receiver associated with the first waste or recycling service vehicle;

identifying a location for the first waste or recycling service vehicle in the geographical service area as the first waste or recycling service vehicle travels though the geographical service area based on the most recently collected location information for the first waste or recycling service vehicle within a designated time period;

collecting location information for a second waste or recycling service vehicle in the geographical service area using a second locating device comprising a global positioning system receiver associated with the second waste or recycling service vehicle;

identifying a location for the second waste or recycling service vehicle in the geographical service area as the first waste or recycling service vehicle travels though the geographical service area based on the most recently collected location information for the second waste or recycling service vehicle within the designated time period;

collecting location information for a third vehicle in the geographical service area using a third locating device comprising a global positioning system receiver associated with the third vehicle;

identifying a location for the third vehicle in the geographical service area as the third waste or recycling service vehicle travels though the geographical service area based on the most recently collected location information for the third vehicle within the designated time period;

calculating turn-by-turn navigation directions from the location of the third vehicle to the location of the first waste or recycling service vehicle;

calculating turn-by-turn navigation directions from the location of the third vehicle to the location of the second waste or recycling service vehicle;

determining whether the turn-by-turn navigation directions from the location of the third vehicle to the location of the first waste or recycling service vehicle or the turn-by-turn navigation directions from the location of the third vehicle to the location of the second waste or recycling service vehicle is a shorter path; and displaying, on an electronic viewing portal, an indication of the shorter path for viewing by a driver of the third vehicle.

2. The method of claim 1, wherein the shorter path comprises shorter in distance.

3. The method of claim 1, wherein the shorter path comprises shorter in time.

4. The method of claim 1, further comprising displaying, on the electronic viewing portal, the turn-by-turn navigation directions for the shorter path.

5. A system for identifying the location of a plurality of waste or recycling service vehicles in a service area, the system comprising:

a processor in communication with a memory storage area and configured to:

collect location information for a first waste or recycling service vehicle in the geographical service area using a first locating device comprising a global positioning system receiver associated with the first waste or recycling service vehicle;

identify a location for the first waste or recycling service vehicle in the geographical service area as the first waste or recycling service vehicle travels though the geographical service area based on the most recently collected location information for the first waste or recycling service vehicle within a designated time period;

collect location information for a second waste or recycling service vehicle in the geographical service area using a second locating device comprising a global positioning system receiver associated with the second waste or recycling service vehicle;

identify a location for the second waste or recycling service vehicle in the geographical service area as the first waste or recycling service vehicle travels though the geographical service area based on the most recently collected location information for the second waste or recycling service vehicle within the designated time period;

collect location information for a third vehicle in the geographical service area using a third locating device comprising a global positioning system receiver associated with the third vehicle;

identify a location for the third vehicle in the geographical service area as the first waste or recycling service vehicle travels though the geographical service area based on the most recently collected location information for the third vehicle within the designated time period;

determine turn-by-turn navigation directions from the location of the third vehicle to the location of the first waste or recycling service vehicle;

determine turn-by-turn navigation directions from the location of the third vehicle to the location of the second waste or recycling service vehicle;

determine whether the turn-by-turn navigation directions from the location of the third vehicle to the location of the first waste or recycling service vehicle or the turn-by-turn navigation directions from the location of the third vehicle to the location of the second waste or recycling service vehicle is a shorter path, and display, on an electronic viewing portal, an indication of the shorter path for viewing by a driver of the third vehicle.

\* \* \* \* \*